US010273561B2

(12) United States Patent
Morris et al.

(10) Patent No.: US 10,273,561 B2
(45) Date of Patent: Apr. 30, 2019

(54) DERIVING HIGH VALUE PRODUCTS FROM WASTE RED MUD

(71) Applicant: PELOTON RESOURCES PTY LTD, Darlington (AU)

(72) Inventors: Richard Morris, Swansea (GB); Matthew Charles Leighton Todd, Darlington (AU); David Adam Lenyszyn, Nedlands (AU); Terence John O'Connor, Burns Beach (AU)

(73) Assignee: PELOTON RESOURCES PTY LTD, Darlington (AU)

( * ) Notice: Subject to any disclaimer, the term of this patent is extended or adjusted under 35 U.S.C. 154(b) by 257 days.

(21) Appl. No.: 15/031,186

(22) PCT Filed: Oct. 21, 2014

(86) PCT No.: PCT/AU2014/000992
§ 371 (c)(1),
(2) Date: Apr. 21, 2016

(87) PCT Pub. No.: WO2015/058239
PCT Pub. Date: Apr. 30, 2015

(65) Prior Publication Data
US 2016/0289791 A1    Oct. 6, 2016

(30) Foreign Application Priority Data

Oct. 21, 2013   (AU) ................................ 2013904057

(51) Int. Cl.
| | | |
|---|---|---|
| *C22B 7/00* | (2006.01) | |
| *C01G 49/02* | (2006.01) | |
| *C01B 33/12* | (2006.01) | |
| *C01F 7/06* | (2006.01) | |
| *C22B 1/02* | (2006.01) | |
| *C22B 3/44* | (2006.01) | |
| *C22B 21/00* | (2006.01) | |
| *B09B 3/00* | (2006.01) | |
| *C01G 23/053* | (2006.01) | |
| *C01F 7/14* | (2006.01) | |
| *C01F 7/26* | (2006.01) | |
| *C01G 23/047* | (2006.01) | |
| *C22B 34/12* | (2006.01) | |

(52) U.S. Cl.
CPC ............ *C22B 7/007* (2013.01); *B09B 3/0016* (2013.01); *C01B 33/12* (2013.01); *C01F 7/066* (2013.01); *C01F 7/141* (2013.01); *C01F 7/26* (2013.01); *C01G 23/047* (2013.01); *C01G 23/053* (2013.01); *C01G 49/02* (2013.01); *C22B 1/02* (2013.01); *C22B 3/44* (2013.01); *C22B 21/0023* (2013.01); *C22B 34/124* (2013.01); *Y02P 10/234* (2015.11); *Y02P 20/129* (2015.11)

(58) Field of Classification Search
CPC ......... B09B 3/0016; C22B 7/007; C22B 1/02; C22B 21/0023; C22B 34/124; C01B 33/12; C01G 49/02; C01G 23/047; C01F 7/20–7/28; C01F 7/066
USPC ...................... 423/112, 132, 140–147, 150.3
See application file for complete search history.

(56) References Cited

U.S. PATENT DOCUMENTS

| | | |
|---|---|---|
| 2,830,892 A | 4/1958 | Udy |
| 3,295,924 A | 1/1967 | Columbo |
| 3,311,449 A | 3/1967 | Atsukawa et al. |
| 3,574,537 A * | 4/1971 | Tsai ........................ C01B 33/14 423/128 |
| 4,668,485 A | 5/1987 | Cresswell et al. |
| 5,030,424 A | 7/1991 | Fulford et al. |
| 6,248,302 B1 | 6/2001 | Barnett et al. |
| 2006/0144797 A1* | 7/2006 | McConchie .............. B09B 3/00 210/724 |
| 2009/0234174 A1* | 9/2009 | Westman .................. B09B 3/00 588/412 |

FOREIGN PATENT DOCUMENTS

| | | | |
|---|---|---|---|
| AU | 223794 | * | 8/1958 |
| CN | 1944295 A | | 4/2007 |
| CN | 101842504 A | | 9/2010 |
| CN | 101891224 A | | 11/2010 |
| CN | 102560121 A | | 7/2012 |
| GB | 843607 | * | 8/1960 |
| GB | 990403 | * | 4/1965 |
| GB | 1398831 | * | 6/1975 |
| JP | 2004-512930 A | | 4/2004 |
| JP | 2010-529289 A | | 5/2008 |

(Continued)

OTHER PUBLICATIONS

Translation of CN-101812592, Aug. 2010.*

(Continued)

Primary Examiner — Steven J Bos

(74) Attorney, Agent, or Firm — Masuvalley & Partners

(57) ABSTRACT

Disclosed herein, is a process for recovering valuable metals and/or their oxides from red mud bauxite residues or similar. The process comprises: calcining a red mud residue having a pH of less than about 10 to provide a calcinated red mud residue; acid leaching the calcinated red mud residue to provide a silica rich solid component and an acid leachate; separating the silica rich solid component and the acid leachate; precipitating an iron rich solid component from the acid leachate; and separating the precipitated iron rich solid component from the acid leachate to provide an aluminium rich liquor.

19 Claims, 3 Drawing Sheets

(56) References Cited

FOREIGN PATENT DOCUMENTS

WO      2002/010068 A1     2/2002
WO      2010079369 A1     7/2010

OTHER PUBLICATIONS

Machine Translation of CN-101891224, Nov. 2010.*
ISA/AU, International Search Report dated Dec. 18, 2014 in International Application No. PCT/AU2014/000992, total 4 pages.
EPO Examiner, The Extended European Search Report dated May 8, 2017 in European Patent Application No. 14855405.8, 7pages.
SIPO Examiner, First Notification of Office Action dated Mar. 20, 2017 in Chinese Patent Application No. 201480056917.1, 22 pages with an English translation.
European Patent Office, Examination Report dated Jun. 21, 2018 in European Patent Application No. 14855405.8, 3 pages.
Hanahan, Colleen et al., "Chemistry of Seawater Neutralization of Bauxite Refinery Residues (Red Mud)," *Environmental Engineering Science*, vol. 21, No. 2, Mar. 2004, pp. 125-138, XP055484813, 14 pages.

* cited by examiner

DERIVING HIGH VALUE PRODUCTS FROM WASTE RED MUD

RELATED APPLICATIONS

This application claims priority to International Patent Application No. PCT/AU2014/000992, filed Oct. 21, 2014, which claims benefit of Australian patent application serial no. 2013904057 filed Oct. 21, 2013.

PRIORITY DOCUMENT

The present application claims priority from Australian Provisional Patent Application No. 2013904057 titled "DERIVING HIGH VALUE PRODUCTS FROM WASTE RED MUD" and filed on 21 Oct. 2013, the content of which is hereby incorporated by reference in its entirety.

TECHNICAL FIELD

The present invention relates to processes for the recovery and purification of metals, metalloids, their oxides or other valuables from bauxite residues (red mud) and other ores.

Throughout this specification reference will specifically be made to the recovery of metals, metalloids, their oxides or other valuables from red mud. However, it will be appreciated that the processes described herein may also be applied to other ores or waste materials containing aluminium oxides and hydroxides, iron oxides, silicon oxides, and other trace metals.

BACKGROUND

A toxic by-product of the Bayer process, red mud has proven problematic in industry for several decades. The substance is generated as a waste product during the production of alumina. For every tonne of alumina produced, 1 to 2 tonnes of red mud are created as a waste stream. Current estimates put the global red mud stocks at 2.5 to 3 billion tonnes. World output is estimated at 50 million tonnes per annum, with Australia the biggest contributor (its output is up to 25 million tonnes per annum). It is estimated that demand for alumina will increase over the following decades, from a combination of developing economies and emerging technologies. The problem of what to do with red mud is therefore a major issue.

The toxic effects attributed to red mud are due to its highly caustic (i.e. basic) nature. During the initial stage of traditional alumina production, bauxite is reacted with concentrated sodium hydroxide (caustic soda) at temperature. The tailings discarded contain a high proportion of caustic soda, in both a raw and chemically combined form. The red mud 'residue' is therefore highly corrosive to flora, fauna and the environment, and must be partially treated to enable safe and responsible storage. Current methods employ partial washing of the toxic residue to decrease the caustic nature, prior to storage in evaporating ponds or dry stacks. These are problematic in themselves; evaporating ponds ultimately invade and react with the surrounding ecosystem, while dry stacks have to be constantly maintained to limit caustic run-off and surface dusting. Spillages of red mud have resulted in human fatalities in addition to damage to rivers, ecosystems, buildings and homes. A viable solution to the treatment and/or reclamation of red mud is required.

Previous methods employed for the treatment and/or reclamation of red mud have attempted to deal with the toxicity either by partial neutralisation or further processing. Queensland Alumina Limited have used seawater for partial treatment, reducing the caustic nature of the residue prior to storage. However, such methods do not fully eliminate the apparent dangers with the substance, nor utilise the entirety of the waste. Other methods have taken the route of metal recovery from the waste. For example, reclamation of iron oxides has proven successful, as has recovery of titanium employing sulphuric acid leaching followed by magnetic separation. Alcoa have developed a process which involves breaking down red mud into components suitable for various applications; their Red Sand, Red Lime and Alkaloam products have uses in areas such as agriculture, acid mine drainage and catalysis. Yet other approaches use neutralised red mud for building materials, ceramics, waste-water treatment and other novel applications. The major drawback of most of these routes is the inability to utilise the majority of the red mud waste. Various value-added metals are entrapped within the residue and, to date, no process has been developed which utilises most of the entrapped valuable materials. The typical composition of red mud contains up to 25% alumina, 60% iron and 15% silica. Other metals such as titanium, magnesium and gallium are also present in trace amounts.

There is a need for processes that process red mud to provide valuable materials and/or overcome the difficulties associated with the storage of red mud.

SUMMARY

The present invention arises from our research into processes that utilise seawater for partial red mud neutralisation, followed by a novel extraction technique that separates valuable metals and/or their oxides contained within. The resulting products are iron oxides (hematite & magnetite), high purity alumina (HPA), smelter grade alumina (SGA), high purity silica (HPS), along with other metals and rare earth metals.

According to a first aspect, there is provided a process for recovering valuable metals and/or their oxides from red mud bauxite residues or similar, the process comprising:
  a) calcining a red mud residue having a pH of less than about 10 to provide a calcinated red mud residue;
  b) acid leaching the calcinated red mud residue to provide a silica rich solid component and an acid leachate;
  c) separating the silica rich solid component and the acid leachate;
  d) precipitating an iron rich solid component from the acid leachate; and
  e) separating the precipitated iron rich solid component from the acid leachate to provide an aluminium rich liquor.

In embodiments, the process further comprises: recovering silica from the silica rich solid component, recovering iron oxides from the iron rich solid component, and/or recovering alumina from the aluminium rich liquor.

In embodiments, the process further comprises a step of adjusting the pH of a red mud bauxite residue to about pH 9 to 10 to provide a neutralised red mud residue. The pH of the red mad bauxite residue may be adjusted by washing with water until the pH of the residue is about pH 9 to 10. In embodiments, the pH of the red mud bauxite residue is adjusted to about 9.5. Advantageously, the red mud bauxite residue may be washed with sea water.

In embodiments, the acid leaching step is carried out at elevated temperature.

In embodiments, silica is recovered from the silica rich solid material by rapid thermal processing (RTP), acid washing and then basic washing to yield high purity silica (HPS).

In embodiments, iron oxides are recovered from the iron rich materials by solid/liquid separation of iron rich materials followed by calcination to iron oxides. Over 90% of iron contained within the red mud can be recovered in this way.

In embodiments, alumina is recovered from the aluminium rich liquor by liquid/liquid extraction followed by back extracting the aluminium rich liquor with acid, separation of precipitated Al(OH)$_3$, and calcination to yield high purity alumina.

Optionally, the process further comprises a step of recovering trace metals, such as titanium, from the acid leachate.

According to a second aspect, there is provided an iron oxide product produced by the process of the first aspect of the invention.

According to a third aspect, there is provided a silica product produced by the process of the first aspect of the invention.

According to a fourth aspect, there is provided an alumina product produced by the process of the first aspect of the invention.

According to a fifth aspect, there is provided a titanium oxide product produced by the process of the first aspect of the invention.

BRIEF DESCRIPTION OF DRAWINGS

Embodiments of the present invention will be discussed with reference to the accompanying drawings wherein.

Figure 1:
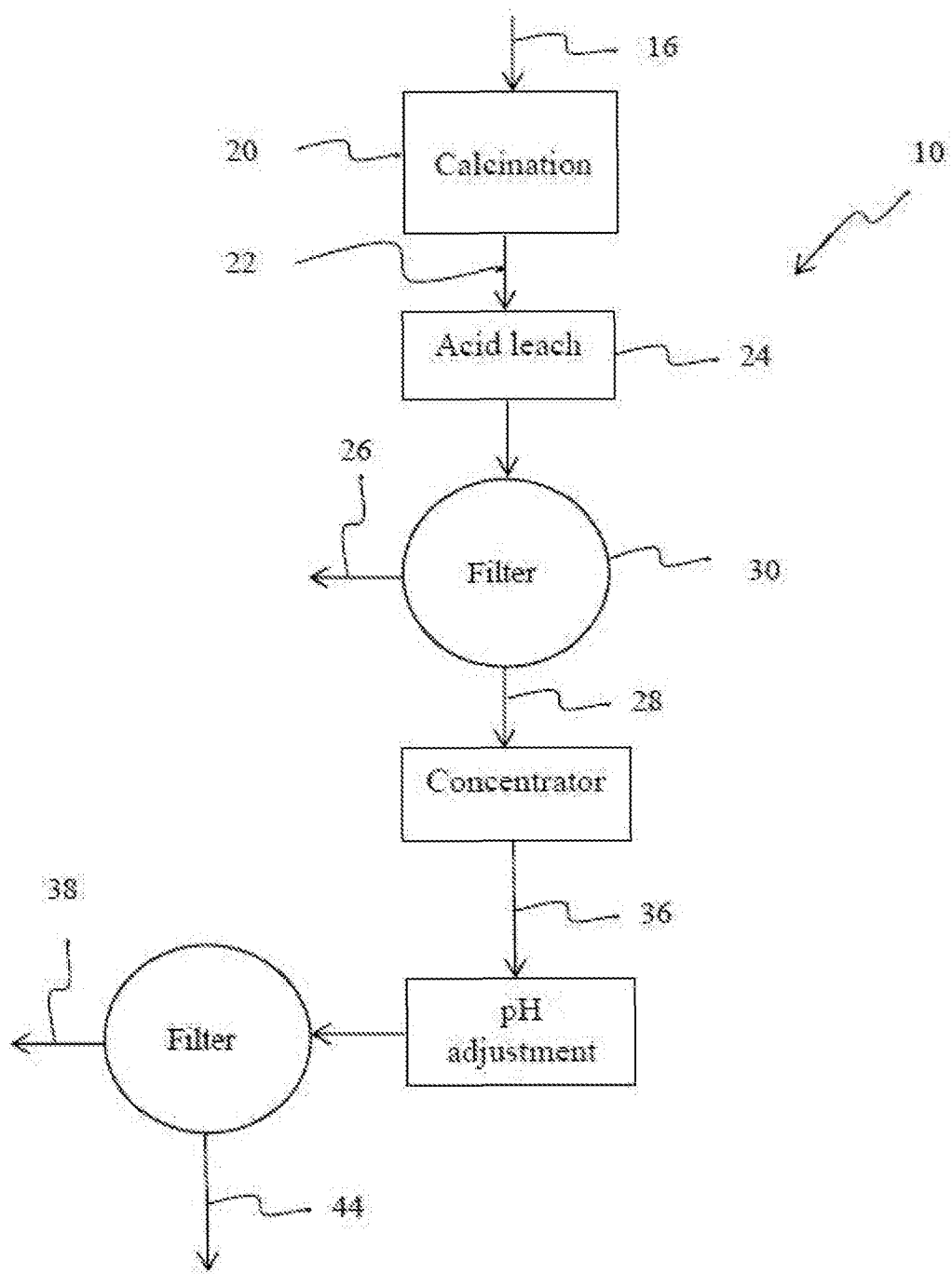
FIG. 1 is a flow diagram showing an embodiment of a process of separating valuable metals and/or their oxides from red mud in accordance with the invention.

| Sampling point | Sample phase | Analysis type |
| --- | --- | --- |
| A | Solid | XRD/XRF & SEM |
| B | Liquid/Solid | pH |
| C | Solid | XRD/XRF & SEM |
| D | Liquid/Solid | XRD/XRF, ICP & pH |
| E | Liquid | ICP |
| F | Liquid | ICP |
| G | Liquid | pH |
| H | Solid | XRD/XRF & GD-MS & SEM |
| I | Solid | XRD/XRF & GD-MS & SEM |
| J | Liquid | ICP & pH |
| K | Liquid | ICP & pH |
| L | Solid | XRD/XRF & GD-MS & SEM |
| M | Solid | XRD/XRF & GD-MS & SEM |
| N | Solid | XRD/XRF & SEM |
| O | Solid | XRD/XRF & GD-MS & SEM |
| P | Solid | XRD/XRF & GD-MS & SEM |

DESCRIPTION OF EMBODIMENTS

As used herein, the terms "red mud" and "red sludge" mean the solid waste product of the Bayer process for refining bauxite to provide alumina. Red mud is a waste product generated by the aluminium manufacturing industry. Red mud typically has the following general composition: $Fe_2O_3$-30 to 60%, $Al_2O_3$-10 to 20%, $SiO_2$-3 to 50%, $Na_2O$-2 to 10%, CaO-2 to 8% and $TiO_2$-0 to 10%. Reference herein to red mud residue "or similar" means other ores or materials that have a similar composition to red mud.

As used herein, the term "about" when used in reference to a process parameter or value means that the value is within at least ±10% of the stated value.

As discussed, we have developed a process for the recovery and purification of entrapped metals, metalloids, their oxides and/or other valuables from bauxite residues (red mud) and other ores. Advantageously, the process may incorporate, in-line monitoring and dedicated quality control sampling points, for analytical testing of the starting, intermediate and end-products. Furthermore, the entirety of the red mud is utilised in the process, with all toxic properties eliminated and minimal wastage of the starting material. The end products obtained include:

Iron oxides, $Fe_2O_3$ & $Fe_3O_4$, 2N-4N purity
Titanium dioxide, $TiO_2$, 2N-4N purity
High purity alumina (HPA), $Al_2O_3$, 3N-7N purity
High purity silica (HPS), $SiO_2$, 3N-7N purity Referring to the Figures, the process 10 of the present invention comprises calcining 20 a red mud residue 16 having a pH of less than about 10 to provide a calcinated red mud residue 22. The calcinated red mud residue 22 is then acid leached in an acid leaching step 24 to provide a silica rich solid component 26 and an acid leachate 28. The silica rich solid component 26 and the acid leachate 28 are separated in separation step 30 and an iron rich solid component 38 is precipitated from the acid leachate 28. The iron rich solid component 38 is separated from the acid leachate 28 to provide an aluminium rich liquor 44.

In embodiments, the process further comprises: recovering silica from the silica rich solid component 26, recovering iron oxides from the iron rich solid component 38, and/or recovering alumina from the aluminium rich liquor 44.

Figure 2:
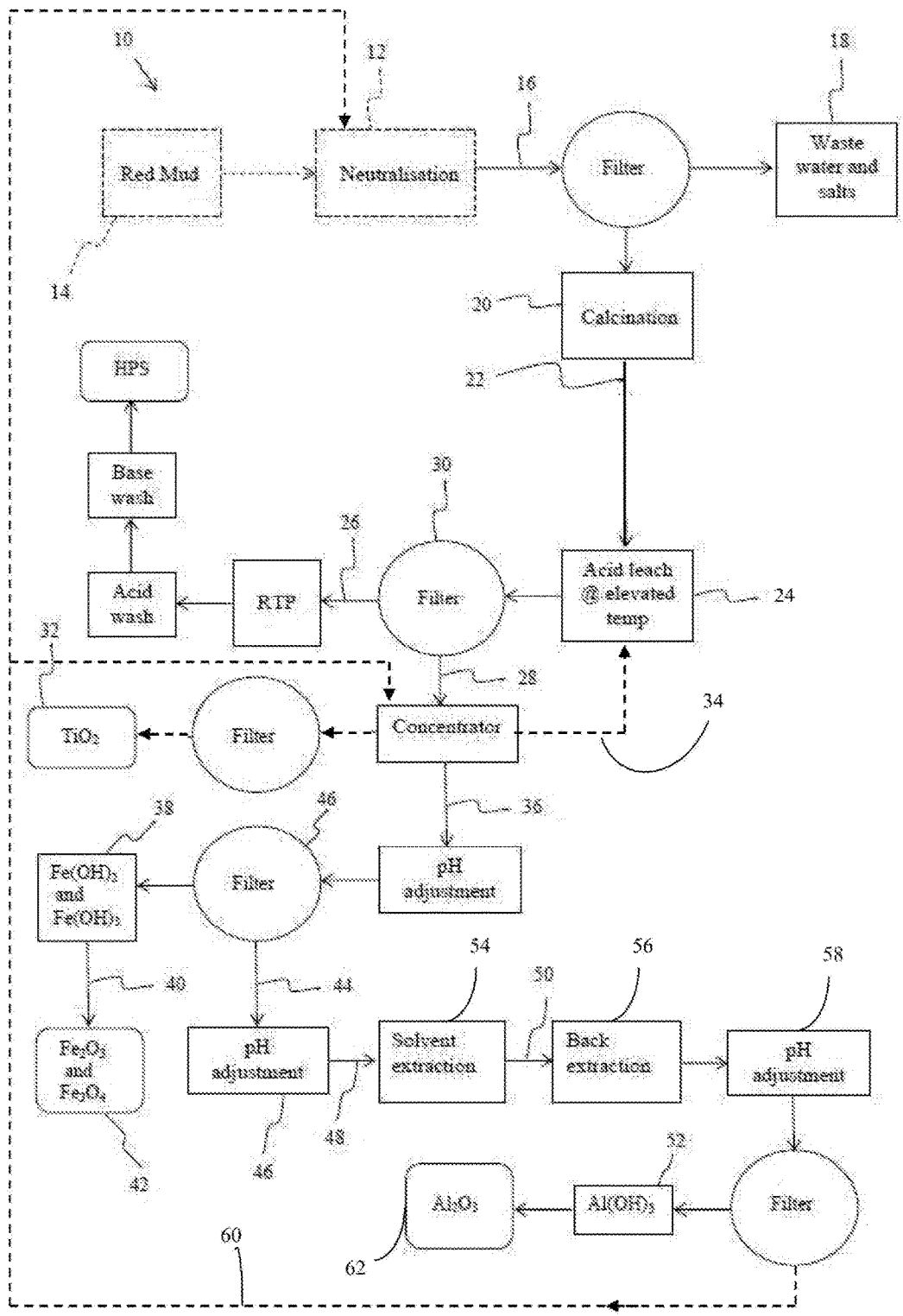
FIG. 2 is a flow diagram showing an embodiment of a process of recovering valuable metals and/or their oxides from red mud in accordance with the invention. Dashed lines in the figure represent optional steps in the process.
Figure 3:
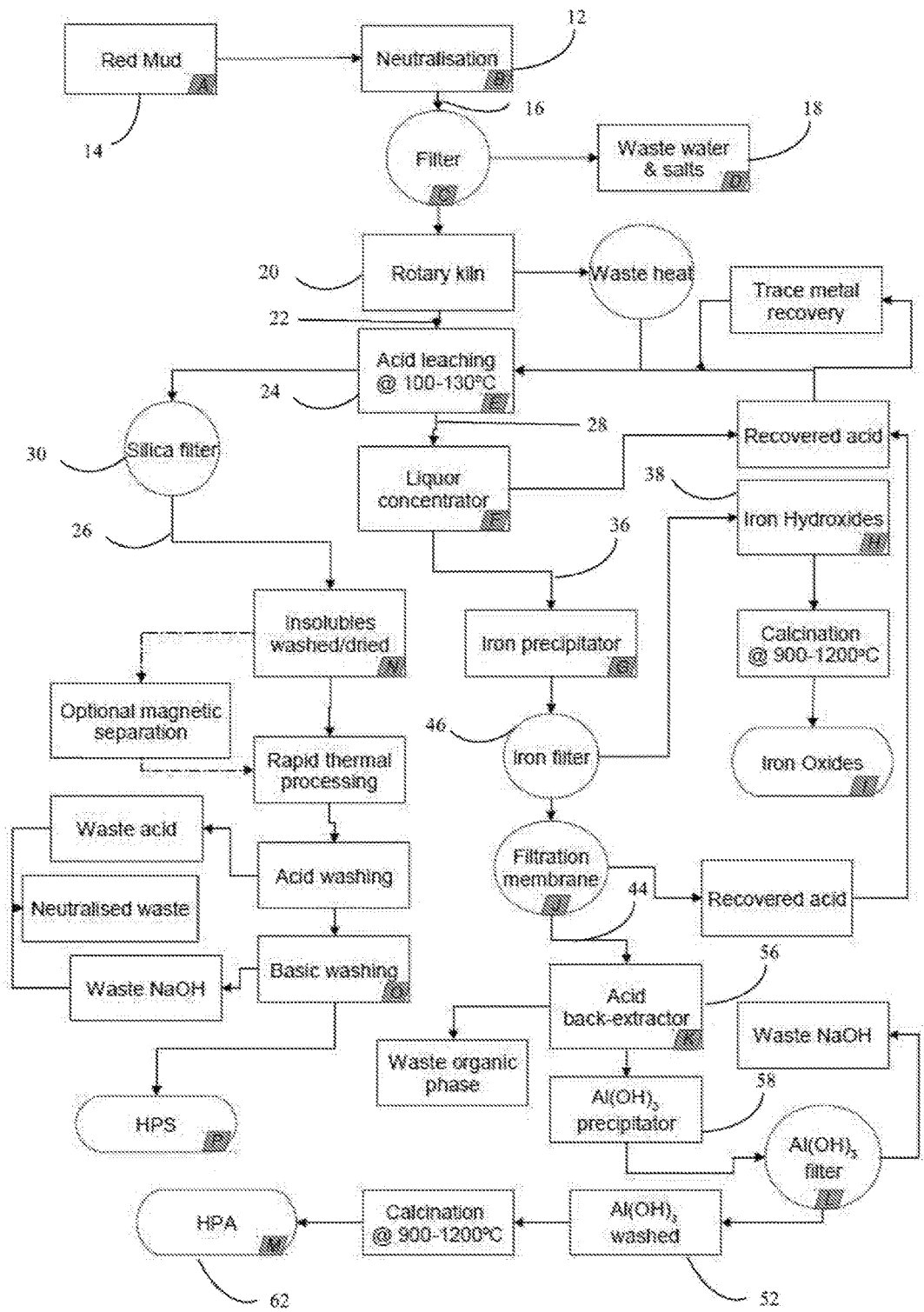
FIG. 3 is a flow diagram showing an embodiment of a process of recovering valuable metals and/or their oxides from red mud in accordance with the invention. Dashed lines in the figure represent optional steps in the process. The symbols A to P in FIG. 3 refer to the following sampling points and analysis required.

A more detailed process 10 of the present invention is shown in FIGS. 2 and 3. The process 10 comprises a step 12 of adjusting the pH of a red mud bauxite residue 14 to about pH 9 to 10 to provide a partially neutralised red mud residue 16. In specific embodiments, the pH of a red mud bauxite residue 14 is adjusted to pH 9.5. The pH of the red mud bauxite residue 14 is adjusted by washing with water until the pH of the partially neutralised red mud residue is about 9 to 10, such as pH 9.5. The red mud bauxite residue can be washed with sea water. The seawater may be filtered of any residue prior to use using conventional methods.

A starting ratio of 1:5 red mud bauxite residue to sea water is suitable. The neutralisation is typically carried out under constant agitation. The pH is constantly monitored, with a desired end-point of pH 9 to 10. An end-point pH of 9.5 is particularly suitable. The resultant red mud bauxite residue/seawater slurry is left to settle for 1 to 3 hours. Optionally, a flocculant can be added at this point to aid settling. Suitable flocculants include polyacrylamide based flocculants such as CYFLOC HX-600 and CYFLOC HX-400 (both available commercially from Cytec Industries, Inc).

The liquid, portion 18 of the mixture is separated from the neutralised red mud residue 16. The liquid portion 18 and the neutralised red mud residue 16 can be separated by any suitable method, such as decanting, filtration, centrifuging, or combinations thereof. The waste seawater 18 obtained can be either fully neutralised using concentrated sulphuric acid (0.05 L per 1000 L seawater), sent to waste (subject to appropriate regulations) or evaporated in waste ponds to yield hydrotalcites and neutral salts. These can be further processed and sold as value added by-products. The neutralised red mud residue 16 can be sampled, dried and analysed using X-Ray Fluorescence/X-Ray Diffraction (XRF/XRD) and Scanning Electron Microscopy (SEM). This establishes the constituent make-up of the red mud residue 16 and hence the expected yield of end-products.

In some cases, the red mud residue may already be at least partially neutralised (i.e. have a pH of less than about 10) and the process neutralisation step 12 just described can be omitted and the process started with the calcination step 20, as described in more detail below.

The partially neutralised red mud residue 16 is then calcinated in calcination step 20 to provide a calcinated red mud residue 22. The partially neutralised red mud residue 16 is calcinated at a temperature of 150-800° C., for a period of 1 to 3 hours. In specific embodiments, the calcination step 20 is carried out at about 500° C. for about 2 hours. The calcination step 20 enables more efficient extraction of aluminium at the later acid-leaching stage. The calcination step 20 may be carried out in a furnace, reactor, kiln or calciner such as a rotary kiln, shaft furnace, multiple hearth furnace or fluidised bed reactor.

In the next step, the calcinated red mud residue 22 is subjected to an acid leaching step 24 at an elevated temperature to provide a silica rich solid component 26 and an acid leachate 28. The acid leaching stage 24 is carried out using an acid at elevated temperature of from about 120° C. to about 200° C. In specific embodiments the acid leaching stage 24 is carried out at 150° C. The acid leaching stage 24 may be carried out for a period of about 4 to about 8 hours. In specific embodiments the acid leaching stage 24 is carried out for a period of about 8 hours. Hydrochloric acid is a suitable acid for use in the acid leaching stage 24, although sulphuric acid and nitric acid have similar properties for leaching and could also be used. The hydrochloric acid may be 8M to 12M, such as 10 M. The ratio of calcinated red mud residue 22 to acid may be from 1:7 to 1:10. During this temperature-elevated acid leaching stage 24, over 90% of aluminium and 95% of iron is extracted from the solid phase and into solution, along with any rare-earth elements and rare-earth metals. Dedicated sampling points are incorporated to analyse the acid-leachate via ICP, and hence the efficiency of the leaching process. This can be used to determine the optimal extraction time for acid digestion. The insoluble silica rich solid component 26 is separated by filtering 30, decanting, centrifuging, or combinations of these ready for further processing as described later.

Whilst the acid leaching step 24 is readily carried out at elevated temperature as described above, it is also possible for the acid leaching step 24 to be carried out in a two-step process comprising a first acid leaching stage conducted at ambient temperature and a second acid leaching stage conducted at elevated temperature. In the first acid leaching stage, the calcinated red mud residue 22 can be contacted with an acid at ambient temperature. The temperature during this first acid leaching stage may be from about 15° C. to about 40° C. Again, hydrochloric acid is suitable for use as the acid. The calcinated red mud residue 22 can be treated with acid at ambient temperature for a period of from about 1 hour to about 2 hours. The ratio of residue to acid may be from 1:7 to 1:10. A second acid leaching stage 24 can then be carried out using an acid at elevated temperature. The elevated temperature may be from about 120° C. to about 200° C. (for example 150° C.). The second acid leaching stage 24 may be carried out for a period of from about 4 to about 8 hours. Again, the insoluble silica rich solid component 26 can then be separated by filtering 30, decanting, centrifuging, or combinations of these ready for further processing.

The resulting acid leachate 28 is rich in titanium chloride. Optionally, titanium dioxide 32 can be precipitated from the acid leachate 28 by evaporating at least some of the hydrochloric acid such that the obtained solid titanium dioxide 32 precipitates from solution under hydrolysis at a temperature of from about 100° C. to about 130° C. The hydrochloric acid gas 34 derived from the evaporation step can be condensed into water and recycled as hydrochloric acid for use in the acid leaching step 24. The solid precipitated titanium dioxide 32 can then be filtered and washed with de-ionised water, before drying under vacuum at a temperature of from about 110 to about 130° C. Titanium dioxide purity will be in the range of 2-4N. Purity can be determined via XRD/XRF & GD-MS analysis.

Alternatively, or in addition, titanium dioxide 32 can be obtained from pH-adjusted aluminium rich liquor 48 after filtration of aluminium hydroxide 52, as described in more detail later.

As mentioned, the insoluble silica rich solid component 26 is removed from the acid leachate 28 by filtration/decanting/centrifuging/sieving or a combination thereof 30. The resulting silica residue is washed with water (e.g. ultra-pure deionised water) and dried under vacuum at a temperature of from about 110° C. to about 130° C. for from about 1 hour to about 2 hours. An optional separation of magnetic impurities contained within the residue can be carried out at this point by magnetic separation (e.g. via high intensity magnetic separation, or the Wetherill separation technique). The obtained dried residue is subjected to rapid thermal processing (RTP) using an infra-red furnace in an oxygen atmosphere. This can be achieved by using tungsten lamps, at a temperature of from about 1000° C. to about 1200° C., for a period of from about 1 second to about 500 seconds. In embodiments, the RTP step is carried out at about 1000° C. for about 120 seconds. The impurities within the silica are brought to the surface during RTP, and can be subsequently removed by acid leaching. A combination of acids can be used, including hydrochloric acid, hydrofluoric acid, sulphuric acid, nitric acid, phosphoric acid or any combination thereof. One option is to use a hydrofluoric acid (5%)/hydrochloric acid (4%) mix in the ratio of 1:7. This is used in the ratio of 1:2 with respect to solid:acid mix, and performed under ultrasound/sonication for 12 to 24 hours. In embodiments, the acid leaching is performed under ultrasound/sonication for 12 hours. The resultant acid leached silica composition can be neutralised and washed with 1M to 4M sodium hydroxide, which removes the silicate residue from the silica to form a base washed silica composition. In embodiments, the sodium hydroxide is 2M. This is followed by rinsing with deionised water and drying under vacuum at 110 to 130° C. Trace analysis of the sample can be performed at this point, which can take the form of XRD/XRF & GD-MS (Glow Discharge Mass Spectrometry) to determine the purity of silica obtained. This can be incorporated into a feedback loop, in order to determine duration of acid leach and/or repeat leaching. The resulting product yields high purity silica (HPS) with a purity of 3N-7N. Purity can be determined via XRD/XRF & GD-MS analysis. Optionally, the purifying process can be omitted, resulting in a lower grade silica as the end product. Optionally, the sodium hydroxide waste can be neutralised with acid. Optionally, the acid waste can be recycled to the acid leaching step 24, to minimise waste.

Following extraction of the silica rich solid component 26, the acid leachate 28 is reduced in volume by evaporation, at a temperature of from about 130° C. to about 200° C., until the volume obtained constitutes 10 to 20% of the initial volume to provide a concentrated acid leachate 36. In embodiments, the evaporation is carried out at a temperature of from about 150° C. to about 160° C. The concentrated acid leachate 36 is rich in aluminium and iron, and can be analysed by ICP to determine the extraction efficiency and concentration obtained. Hydrochloric acid obtained at this stage can be recovered and used in one or more of the acid leaching step(s). Optionally, trace metal recovery step can be performed on the recovered acid.

The iron rich solid component 38 is then precipitated from the concentrated acid leachate 36. This can be achieved by adjusting the pH of the concentrated acid leachate 36 to between 10 and 11 using a base, such as 2M to 10M sodium hydroxide. In embodiments, the pH of the concentration acid leachate is adjusted to pH 10.5 using 2M sodium hydroxide. The pH can be adjusted using a pH feedback loop, resulting in precipitation of an iron rich solid component 38 comprising iron hydroxides ($Fe(OH)_2$ and $Fe(OH)_3$). The iron rich solid component 38 can be separated from an aluminium rich liquor 44 using a separation device 46, Specifically, the separation may be effected by filtration, decanting, centrifuging, sieving or any combination thereof to provide the iron rich solid component 38 and the aluminium rich liquor 44. Once separated, the iron rich solid component 38 is washed with 2M to 10M sodium hydroxide (such as 2M sodium hydroxide) then deionised water, prior to drying under vacuum at from about 110° C. to about 130° C., such as at about 120° C. The hydroxides are then calcinated in iron calcination step 40 in the absence of air at a temperature of from about 200° C. to about 800° C. to yield iron oxides ($Fe_2O_3$ and $Fe_3O_4$) 42. The calcination can be performed for a period of from about 1 hour to about 10 hours. In embodiments, iron calcination step 40 is carried out at about 500° C. for about 8 hours. The solid oxides thus obtained can be analysed by XRD/XRF & GD-MS to determine iron purity and trace compounds.

Alumina is recovered from the aluminium rich liquor 44 by adjusting the pH of the liquor to between 2 and 4 inclusive in pH adjustment step 46 to provide a pH adjusted aluminium rich liquor 48. In specific embodiments, the pH is adjusted to about 3. The pH can be adjusted using an acid, such as 2M to 10M hydrochloric acid. In specific embodiments, the hydrochloric acid is 2M. The pH adjustment step 46 can be controlled via a pH feedback loop. The aluminium content at this point can be determined by means or ICP analysis. Aluminium hydroxides 52 are selectively removed from the pH adjusted aluminium rich liquor 48 by extraction using an organic phase comprising a water immiscible solvent and an aluminium extracting agent in solvent extraction step 54. The extracting agent can be any agent that complexes with aluminium ions with selectivity, such as a phosphoric or phosphonic acid derivative. Suitable extracting agents include phosphorus-based acids such as: monoalkyl- and dialkylphosphoric acids, including bis(2-ethylhexyl) phosphoric acid (HDEHP), dihexylphosphoric acid (HDHP), bis(1,3-dimethylbutyl)phosphoric acid (HBDMBP), and diisodecylphosphoric acid (DIDPA); monoalkyl- and dialkylphosphonic acids, including 2-ethythexyl-ethylhexylphosphonic acid )HEHEHP); monoalkyl- and dialkylphosphinic acids; thiophosphoric acids; thiophosphonic acids; thiophosphinic acids and thiophosphorus acids.

Preferably, the extracting agent is dissolved in a water immiscible solvent. The water immiscible solvent may be an organic solvent. The organic solvent may be a hydrocarbon, such as a $C_5$-$C_{16}$ alkane. The concentration of the extracting agent in the solvent may be from about 15 to about 30% v/v. The organic phase containing the extracting agent is added to the pH adjusted aluminium rich liquor 48 in the ratio 1:1, and reacted at from about 40° C. to about 60° C. for from about 1 hour to about 2 hours. The resultant organometallic complex contains over 80% of the extracted aluminium. The organic phase containing extracted aluminium 50 can be separated from the aqueous phase by any suitable means. For example, the organic phase 50 can be separated from the aqueous phase using a filtration membrane, a membrane contactor, a centrifugal contactor, separating funnel, or any other suitable means. The extracted aluminium level can be determined by ICP analysis. A feedback loop can be incorporated to determine the optimal extraction time vs. level of aluminium obtained in the organic phase. The acidic aqueous phase can be evaporated, with re-generation of hydrochloric acid for re-use in the acid leaching step 24. The evaporation can be carried out at from about 130° C. to about 200° C. In specific embodiments, the evaporation is carried out at from about 150° C. to about 160° C. Optionally, trace elements can be recovered from the regenerated acid and the trace elements thus obtained can be washed, dried and purified using standard procedures.

Aluminium hydroxide 52 can then be recovered from the organic phase 50 by back extracting the organic phase with an acid in back extraction step 56. For example, 2M to 10M hydrochloric acid can be added to form an acidic solution of $Al^{3+}$ ions, adjusting the pH to between 2 and 4. In specific embodiments, 8M hydrochloric acid is used to adjust the pH to about 3. The pH can be maintained at the desired level using a feedback loop. The acidic aqueous phase can be separated from the organic phase by any suitable liquid/liquid separation process, such as by using a filtration membrane, a membrane contactor or a centrifugal contactor.

2M to 10M sodium hydroxide can be used to precipitate the aluminium ions as aluminium hydroxide ($Al(OH)_3$) with pH in the region of 6 to 9 in pH adjustment step 58. In specific embodiments, aluminium hydroxide is precipitated using 2M sodium hydroxide to adjust the pH to 6.5. The pH at this stage can be maintained between 6 and 9 using a feedback loop. The precipitated aluminium hydroxide 52 can then be separated from the filtrate by filtration, decanting, centrifuging, sieving, or any combination thereof. Optionally, the filtrate 60 can be recycled by transferring it to the seawater neutralisation stage 12, thereby minimising liquid waste and maximising extraction yield. Once separated, the precipitate is washed with 2M to 10M sodium hydroxide (such as 2M sodium hydroxide) then deionised water, prior to drying under vacuum at from about 110° C. to about 130° C., such as at about 120° C. Analysis via XRD/XRF & GD-MS can be used to determine the purity at this stage, and whether further processing is required, i.e. recrystallization and/or re-precipitation. The $Al(OH)_3$ thus obtained can be calcinated at temperatures of from about 600° C. to about 1200° C. for a period of from about 1 hour to about 10 hours to yield alumina, which can optionally undergo further purification steps to yield high purity alumina (HPA) 62. In specific embodiments, the $Al(OH)_3$ is calcinated at about 800° C. for about 8 hours. The further purification steps can include washing with solvents, recrystallization in acids and gravimetric separation. The final HPA purity can be determined via XRD/XRF & GD-MS analysis and sorted according to particle size.

Optionally, titanium dioxide 32 can be obtained from filtrate 60. Specifically, titanium dioxide 32 can be precipitated from filtrate 60 by evaporation of hydrochloric acid such that the obtained solid titanium dioxide 32 precipitates from solution under hydrolysis at a temperature of 100-130° C. Optionally, the hydrochloric acid gas 34 can be condensed into water and recycled as hydrochloric acid for use in the acid leaching step 24. The solid precipitated titanium dioxide 32 can then be filtered and washed as described earlier.

Preferably, one or more of the stages of the aforementioned processes are controlled and/or monitored to effect a high purity of product in combination with optimal time at each stage. In-line monitoring of the ongoing process enables the most efficient use of the energy and resources available. Testing performed by analytical instrumentation allows detection of impurities at quality critical stages. Such testing can be incorporated into feedback loops, which can be used to control factors such as temperature, crushing speed, pH level, reagent concentration etc. at individual steps within the process. Instrumentation used should be able to detect trace impurities to the degree of parts per million (ppm) and parts per billion (ppb) in order to yield final products of the magnitude 3N-7N purity.

Dedicated sampling points within the process allow regular testing and analysis of the starting, intermediate and finished materials. This, together will the quality control outlined above, forms the overriding factor in ensuring product quality.

Preferably, all work is performed in a dedicated clean environment, ensuring elimination of contamination/impurities from external sources. Regents and reactants can be controlled and traceable to national standards, utilising ultra-low impurity acid for acid-leaching (e.g. VLSI-grade/ULSI-grade) to prevent introduction of unwanted trace metals.

Management and control of process via international standards, which shall include ISO 9001 for the quality management system, ISO 17025 for the laboratory environment, and additional controls such as ISO 14001 (environmental) and ISO 18001 (health & safety).

The entirety of the process can be subjected to strict guidelines with regards to the management and control of waste/environmental impacts, due to the toxic nature attributed to red mud. Although many stages within the process can be controlled independently, several areas have overlap and sharing of resources with neighbouring steps. The following can be controlled throughout:

The pH of the neutralisation process is carefully monitored, to ensure any resulting waste residues are not damaging to the environment. All waste seawater discharged will be in the pH range 7-9, and contain levels of toxicity comparable to standard seawater. Hydrotalcites produced at the neutralisation stage are not only harmless, but can be sold as a value-added by-product. Furthermore, waste filtrate at the alumina stage can be recycled for use at the seawater neutralization stage, thereby minimising liquid waste and maximising extraction efficiency of the entire process.

Acid recycling/regeneration is possible at several stages within the process, thus reducing the cost of reagents required for acid leach. Recovery rate is estimated to be between 85-90%, based on a combination of regeneration/evaporation/filtration and back extractions.

Waste heat generated throughout has the potential to be stored and transferred to independent steps, thus reducing the overall energy required. For example, waste heat from initial red mud calcination can be used to aid acid leaching at elevated temperature.

Minimal solid waste is produced during the overall process, with typical impurities of rare earths and rare metals contributing less than 1% to the red mud starting material. These are separated at either the aluminium or silica extraction phase, and can be either neutralised to waste or processed further for value-added by-products.

Sample feedback loops incorporated within the process (see above) can be used to minimise heating and reagent costs, by selectively optimising the extraction process over time. This has a direct effect on lowering environmental impact, through optimal control at various critical stages It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

The invention claimed is:

1. A process for recovering valuable metals and/or their oxides from red mud bauxite residues, the process comprising:
   a) calcining a red mud residue having a pH of less than about 10 at 150 to 500° C. to provide a calcined red mud residue;
   b) acid leaching the calcined red mud residue with hydrochloric acid of 8M to 12M at an elevated temperature to provide a silica rich solid component and an acid leachate;
   c) separating the silica rich solid component and the acid leachate;
   d) precipitating an iron rich solid component from the acid leachate; and
   e) separating the precipitated iron rich solid component from the acid leachate to provide an aluminium rich liquor.

2. The process of claim 1, wherein the process further comprises recovering silica from the silica rich solid component.

3. The process of claim 1, wherein the process further comprises recovering iron oxides from the iron rich solid component.

4. The process of claim 1, wherein the process further comprises recovering alumina from the aluminium rich liquor.

5. The process of claim 1, further comprising a step of adjusting the pH of a red mud bauxite residue to pH 9 to 10 to provide a partially neutralised red mud residue.

6. The process of claim 5, wherein the red mud bauxite residue is washed with sea water.

7. The process of claim 5, wherein the partially neutralised red mud residue is calcined at a temperature of 500° C.

8. The process of claim 7, wherein the partially neutralised red mud residue is calcined for a period of 2 hours.

9. The process of claim 1, further comprising separating a silica rich insoluble component from an acid leachate derived from the acid leaching step.

10. The process of claim 9, further comprising precipitating titanium dioxide from the acid leachate by evaporation.

11. The process of claim 10, wherein evaporated acid is condensed into water and recycled for use in the acid leaching step.

12. The process of claim 1, further comprising separating iron rich solid components from the silica rich insoluble component by magnetic separation.

13. The process of claim 12, comprising subjecting the silica rich insoluble component to rapid thermal processing (RTP).

14. The process of claim 13, comprising removing impurities from the silica rich insoluble component after RTP by acid leaching.

15. The process of claim 14, wherein an acid leached silica component derived from the acid leaching is washed with a base to form a base washed silica component.

16. The process of claim 1, further comprising reducing the volume of the acid leachate obtained from step c) by evaporation.

17. The process of claim 16, comprising precipitating iron hydroxides from the concentrated acid leachate.

18. The process of claim 14, comprising separating the precipitated iron hydroxides from an aluminium rich liquor, adjusting the pH of the aluminium rich liquor from 2 to 4 using an acid to provide a pH adjusted aluminium rich liquor, and contacting the pH adjusted aluminium rich liquor with an organic phase comprising a water immiscible solvent and an aluminium extracting agent under conditions to extract aluminium from the pH adjusted aluminium rich liquor in to the organic phase.

19. The process of claim 1, wherein, in the acid leaching of step (b), a ratio of the calcined red mud residue to hydrochloric acid is between 1:7 and 1:10.

* * * * *

UNITED STATES PATENT AND TRADEMARK OFFICE
CERTIFICATE OF CORRECTION

PATENT NO.         : 10,273,561 B2                                    Page 1 of 1
APPLICATION NO.    : 15/031186
DATED              : April 30, 2019
INVENTOR(S)        : Richard Morris et al.

It is certified that error appears in the above-identified patent and that said Letters Patent is hereby corrected as shown below:

In the Claims

In Column 12, in Claim 18, on Line 1, please amend "14" to --17--.

Signed and Sealed this
Twenty-seventh Day of August, 2019

Andrei Iancu
*Director of the United States Patent and Trademark Office*